United States Patent
Haas et al.

(10) Patent No.: US 6,920,849 B2
(45) Date of Patent: Jul. 26, 2005

(54) DEVICE FOR CONTROLLING CYLINDER DISCONNECTION IN AN INTERNAL COMBUSTION ENGINE

(75) Inventors: Michael Haas, Weisendorf (DE); Henning Karbstein, Strullendorf (DE)

(73) Assignee: INA-Schaeffler KG, Herzogenaurach (DE)

( * ) Notice: Subject to any disclaimer, the term of this patent is extended or adjusted under 35 U.S.C. 154(b) by 87 days.

(21) Appl. No.: 10/686,099

(22) Filed: Oct. 14, 2003

(65) Prior Publication Data

US 2004/0112326 A1 Jun. 17, 2004

(30) Foreign Application Priority Data

Oct. 11, 2002 (DE) .......................................... 102 47 516

(51) Int. Cl.⁷ ................................................ F01L 1/12
(52) U.S. Cl. ................................ 123/90.12; 123/90.16; 123/90.32; 123/198 F
(58) Field of Search ........................... 123/90.11, 90.12, 123/90.13, 90.14, 90.16, 90.32, 198 F

(56) References Cited

U.S. PATENT DOCUMENTS

| | | | | |
|---|---|---|---|---|
| 4,050,435 A | * | 9/1977 | Fuller et al. .............. | 123/198 F |
| 4,401,069 A | * | 8/1983 | Foley ....................... | 123/90.32 |
| 6,588,394 B2 | * | 7/2003 | Zheng ...................... | 123/198 F |
| 6,752,121 B2 | * | 6/2004 | Rayl et al. ................ | 123/90.16 |

FOREIGN PATENT DOCUMENTS

| | | |
|---|---|---|
| DE | 196 28 024 A1 | 1/1998 |
| DE | 196 32 651 A1 | 2/1998 |

* cited by examiner

*Primary Examiner*—Erick Solis
(74) *Attorney, Agent, or Firm*—Volpe and Koenig, P.C.

(57) ABSTRACT

A device for controlling cylinder disconnection in internal combustion engines, with a control device which permits in one of its two switching states an actuation of the valve concerned, with transmission devices which, in dependence on the switching state of the control device, transmit the cam stroke to the valve, and with a control unit acting on the control device. This provides a high switch over reliability with only small requirements for the changeover technology used. For this, the device has a data memory for the detection of the time course of the movement behavior of the gas exchange valves of cylinders of the internal combustion engine, and a data processing unit which provides a combination of gas exchange valves into valve groups with regard to a common activation or deactivation.

7 Claims, 3 Drawing Sheets

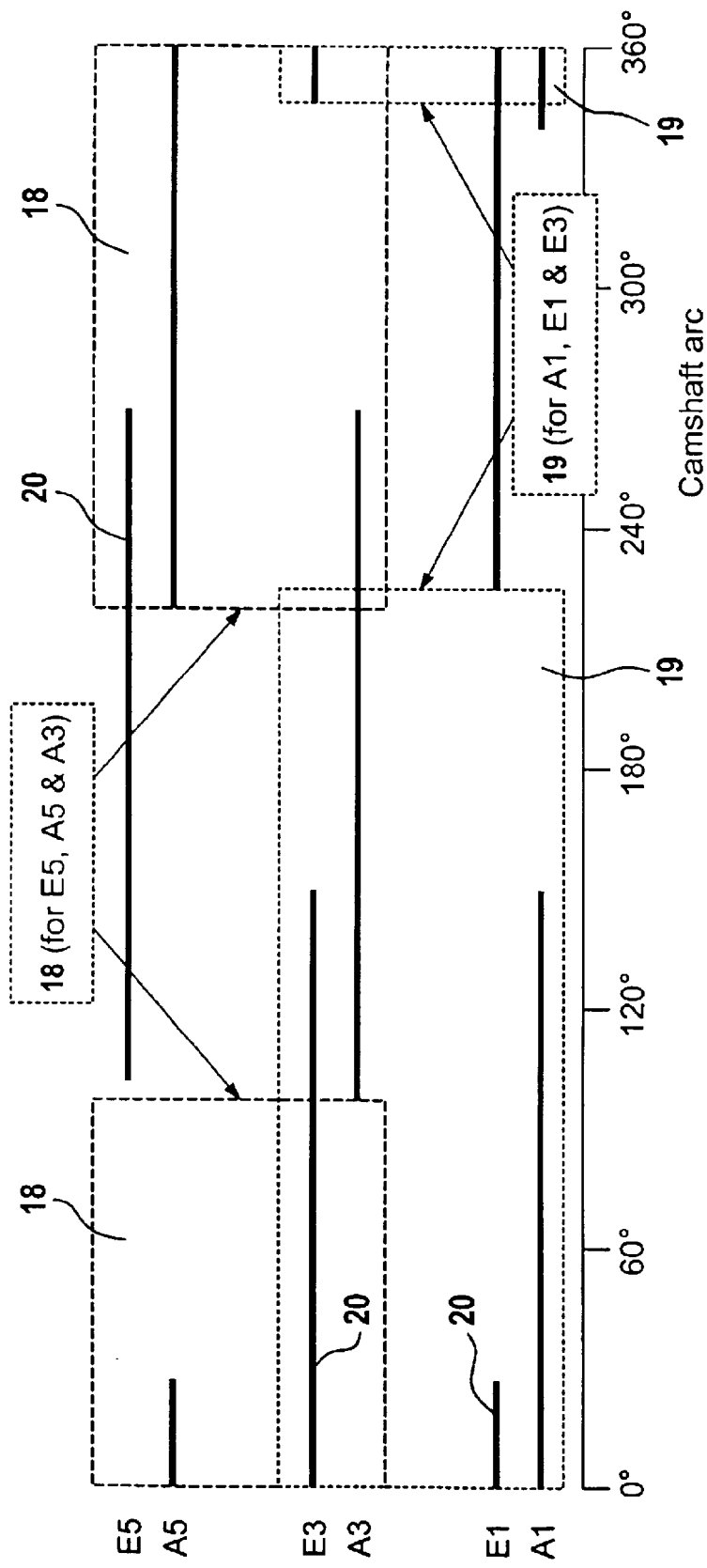

DEVICE FOR CONTROLLING CYLINDER DISCONNECTION IN AN INTERNAL COMBUSTION ENGINE

BACKGROUND

The invention relates to a device for controlling cylinder disconnection in internal combustion engines of the type having at least one control arrangement including a switchable element for valve actuation of the valves and permitting in one of its two switching states an actuation of the valve concerned, and having transmission devices which, in dependence on the switching state of the control arrangement, transmit the cam rise produced by the camshaft to the valve via the switchable element, and with a control unit acting on the switching arrangement.

In the partial load region of an Otto engine cycle, there is only a comparatively low efficiency of the engine because of low turbulence in the combustion chambers, low cylinder filling, and high charge exchange losses. A possibility for increasing the efficiency in the partial load region includes reducing the throttling of the cylinders. However, cylinder disconnection is preferably used, in which individual combustion chambers of the engine are disconnected for a predetermined time.

Thus from DE 196 28 024 A1 an internal combustion engine is known which has a camshaft and, for each gas exchange valve, a transmission device by means of which the cam stroke can be transmitted to the gas exchange valve. The cylinders of the internal combustion engine are divided into two cylinder groups, an actuator being allocated to each group and permitting the actuation of the gas exchange valves in only one of its two switching states.

In such a solution, all the valves of a cylinder group are changed over at a given instant, leading to the control becoming effective only after passing through the switch over window allocated to the valve concerned, and to diverse problems in changing over the valve drives.

SUMMARY

From this background, the object of the invention is to further develop a device for controlling cylinder disconnection such that a high switching reliability is attained with only small requirements on the switching technique used.

The solution to this objective results from the features of the main claim, while advantageous embodiments and developments may be gathered from the dependent claims.

Accordingly, it is provided that a device according to the invention has a data memory for detecting the time course of the movement behavior of the gas exchange valves of cylinders of the internal combustion engine, and a data processing unit which provides a combination of gas exchange valves into valve groups with regard to a common activation or deactivation thereof and passes it on to the control device, in which an activation or deactivation instant is allocated to the valve groups and which drives the control device by which the switchable elements for valve actuation of the valves belonging to the valve group are actuated.

The invention has the associated advantage that because of a specific combination into valve groups of gas exchange valves to be actuated, an optimization of the size of the switchover window provided for the performance of a switch-over process can take place, and that switching reliability is ensured with a comparatively small number of control devices.

In an embodiment of the invention, for the determination of a parameter for the selection and allocation of valves to a valve group, a selection program for coincidence testing the control times of the gas exchange valves is present, and therewith the size of a switchover window for the simultaneous actuation of selected valves is concluded from the degree of coincidence.

The preconditions are hereby provided for an increase of the number of valves which can be switched over with a control device while maintaining a sufficient switching reliability.

Moreover, a determination of the minimum number of required control devices can take place in the selection program of the data processing unit, in dependence on the breadth of the switch over window.

In a further advantageous embodiment of the invention, for a combination of valves into a valve group by the data processing unit, only those are permitted which are in a closed state at the instant of actuating the switchable elements by the control valve.

According to an embodiment of the invention, the control device is a hydraulically controlled system which preferably contains two control valves. However, mechanical as well as other systems are also conceivable and provided.

Within the scope of the invention, at least one intake valve and at least one exhaust valve, which belong to different combustion chambers, can be actuated by the control device by actuation of the switchable elements allocated to the valves.

BRIEF DESCRIPTION OF THE DRAWINGS

The invention is explained in detail hereinafter on the basis of a preferred exemplary embodiment relating to a six-cylinder internal combustion engine, in connection with the accompanying drawings.

FIG. 3 shows a control time diagram for selected cylinders with an indication of an associated switchover window.

DETAILED DESCRIPTION OF THE PREFERRED EMBODIMENT(S)

According to the exemplary embodiment, a V-6 engine has cylinders 1, 2, 3, 4, 5 and 6, which respectively have two inlet valves 1.1, 2.1, 3.1, 4.1, 5.1 and 6.1 and two exhaust valves 1.2, 2.2, 3.2, 4.2, 5.2, and 6.2. The inlet valves and the exhaust valves are driven by the camshaft of the internal combustion engine through a cam rise following actuating device of the switchable tappet 7.

Figure 1:
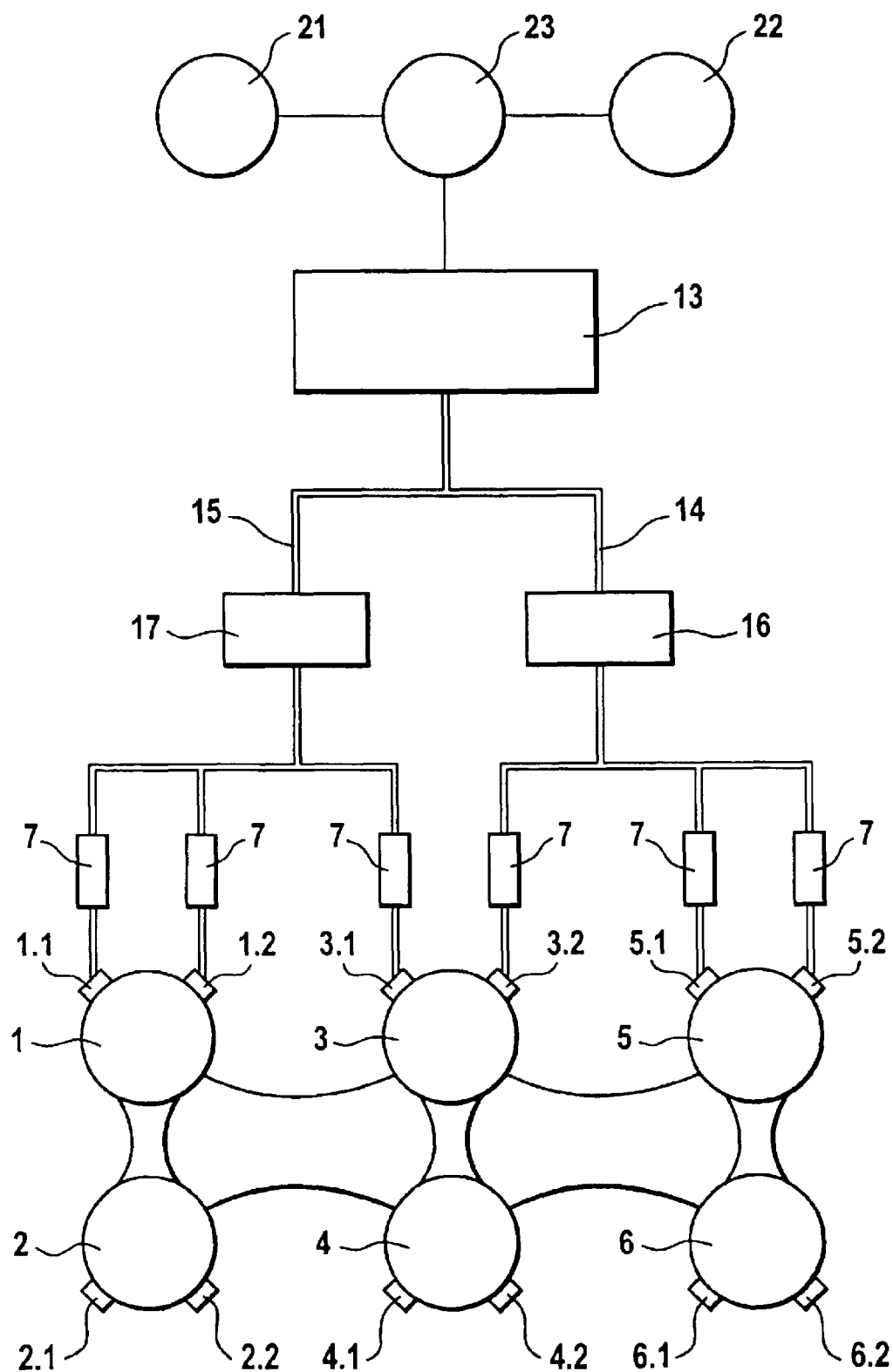
FIG. 1 shows a schematic diagram of a device for cylinder disconnection according to the invention, with a hydraulically actuated switching device.
Figure 2:
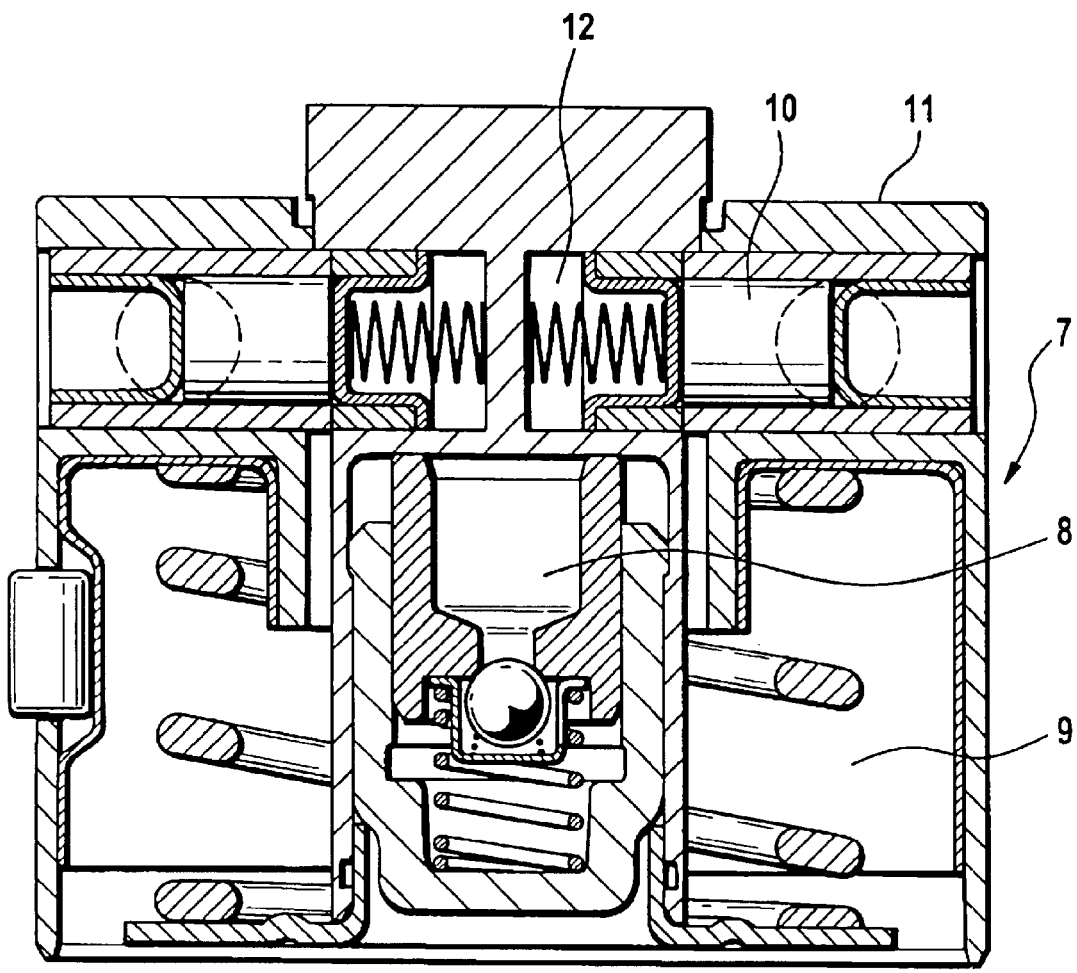
FIG. 2 shows a sectional diagram of a switchable tappet controlled by a changeover device.

The construction of such a switchable tappet 7 is shown in FIG. 2. It is formed essentially of two components which are axially displaceable relative to one another, the inner tappet 8 and the outer tappet 9. A locking element 10 is provided for coupling the movement of the inner tappet 8 and outer tappet 9, which extends transversely to the axial direction of movement of the inner tappet 8 and outer tappet 9, and assumes under spring action an initial position in which the movement of the outer tappet 9 leaves the position of the inner tappet 8 unaffected. A movement of the outer tappet 9, caused by the action of the cam on the cam abutment surface 11 of the outer tappet 9, therefore does not lead to an actuation of the respective gas exchange valve driven by the inner tappet 8. If on the other hand the locking element 10 is pushed against the spring action until it engages in a recess 12 provided in the inner tappet 8, the inner tappet 8 follows the movement of the outer tappet 9 and actuates the corresponding gas exchange valve.

In order to make possible the activation of the locking element 10 of the switchable tappet 7, the switchable tappet 7 is a component of a hydraulic circuit. Hydraulic ducts 14, 15 lead from an accumulator 13 of the hydraulic circuit to control valves 16, 17, which are connected by further hydraulic ducts 18, 19 to the switchable tappets 7 of the cylinders which can be switched on or off. In the specific case, there thus exists a connection of the control valve 16 with the switchable tappets 7 of the intake valves 5.1 and the exhaust valves 5.2 of the cylinder 5 and also with the exhaust valves 3.2 of the cylinder 3. A connection is produced by the control valve 17 to the intake valves 3.1 of cylinder 3 and to the intake valves 1.1 and the exhaust valves 1.2 of cylinder 1. The distribution selected here of the switchable tappets 7 to the two control valves 16 and 17 is connected with a uniform distribution of the work to be performed during the switch over process and thus with reproducible changeover conditions.

As a result, high reliability of the switching process can be attained by such an allocation for the common actuation of the gas exchange valves concerned can accordingly be attained by the use of only two control devices. The switch over windows 18 and 19 serving as a measure of the switch over reliability are shown by way of example in FIG. 3. Furthermore, the diagram also relates to the control times 20 correlated with the switch over windows 18 and 19.

The control times 20 allocated to the gas exchange valves are documented in a data memory 21 and serve a data processing unit 22 as the basis of a combination of switchable tappets 7 into a group which is driven in common by one of the control valves 16, 17. The drive takes place after the control valve concerned has been activated by a control unit 23, in which the group of switchable tappets 7 is allocated to the respective control valve.

Furthermore, it is within the scope of the invention that the data memory 21 and the data processing unit 22 are components of the control unit 23 so that efficient data interchange can be supported.

LIST OF REFERENCE NUMERALS

1–6 cylinder
6.1 intake valves
1.2–6.2 exhaust valves
7 switchable tappet
8 inner tappet
9 outer tappet
10 locking element
11 cam abutment surface
12 recess
13 accumulator
14 hydraulic duct
15 hydraulic duct
16 control valve
17 control valve
18 switch over window
19 switch over window
20 control time
21 data memory
22 data processing unit
23 control unit

What is claimed is:

1. Device for controlling disconnection of the cylinders in internal combustion engines, comprising at least one control device acting on a switchable element for valve actuation of valves and permitting in one of two switching states an actuation of the valve concerned, including transmission devices which, in dependence on a switch over state of the control device, transmit a cam rise produced by a camshaft to the valve provided with the switchable element, and a control unit acting on the control device, wherein the device has a data memory for detection of a time course of movement behavior of the gas exchange valves of the cylinders of the internal combustion engine, and a data processing unit which provides a combination of gas exchange valves into valve groups with regard to a common activation or deactivation, and passes on to the control unit in which an activation or deactivation instant is allocated to the valve groups, and which drives the control device by which the switchable elements for valve actuation of the valves belonging to the valve group are actuated.

2. Device according to claim 1, wherein, for determination of a parameter for selection and allocation of the valves to the valve group, a selection program for coincidence testing control times (20) of the gas exchange valves is present in the data processing unit (22), and therewith a size of a switch over window (18, 19) for simultaneous actuation of selected valves is concluded from a degree of coincidence.

3. Device according to claim 2, wherein a determination of a minimum number of control devices (16, 17) takes place in the selection program of the data processing unit (22) in dependence on a breadth of the changeover window (18, 19).

4. Device according to claim 1, wherein for a grouping of the valves into a valve group, only those are permitted by the data processing unit (22) which at an instant of driving the switchable elements (7) have the valve actuators in a closed state or at a sufficiently great distance from a beginning of a next cam rise.

5. Device according to claim 1, wherein a hydraulically driven system is provided as the control device (16, 17).

6. Device according to claim 1, wherein the control device includes two control valves (16, 17).

7. Device according to claim 1, wherein at least one intake valve and at least one exhaust valve, which belong to different combustion chambers, are actuated by action of the control device (16, 17) on the switchable elements (7) allocated to the valves.

\* \* \* \* \*